United States Patent
Wagner et al.

(10) Patent No.: US 9,915,735 B2
(45) Date of Patent: Mar. 13, 2018

(54) METHOD FOR POSITIONING A VEHICLE

(71) Applicant: GM GLOBAL TECHNOLOGY OPERATIONS LLC, Detroit, MI (US)

(72) Inventors: Nikolas Wagner, Rüsselsheim am Main (DE); Marco Moebus, Rüsselsheim am Main (DE); Bruno Praunsmaendel, Rüsselsheim am Main (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/216,260

(22) Filed: Jul. 21, 2016

(65) Prior Publication Data
US 2017/0031031 A1  Feb. 2, 2017

(30) Foreign Application Priority Data
Jul. 25, 2015  (DE) .................. 10 2015 009 650

(51) Int. Cl.
| | | |
|---|---|---|
| *G01S 19/42* | (2010.01) | |
| *G01C 23/00* | (2006.01) | |
| *G01S 19/07* | (2010.01) | |
| *G01S 19/40* | (2010.01) | |
| *G01S 19/51* | (2010.01) | |
| *G01S 5/00* | (2006.01) | |
| *G01S 19/48* | (2010.01) | |
| *G01C 22/00* | (2006.01) | |
| *G01S 13/08* | (2006.01) | |
| *G01S 15/08* | (2006.01) | |

(52) U.S. Cl.
CPC ............ *G01S 19/421* (2013.01); *G01C 22/00* (2013.01); *G01C 23/00* (2013.01); *G01S 5/0072* (2013.01); *G01S 19/07* (2013.01); *G01S 19/40* (2013.01); *G01S 19/48* (2013.01); *G01S 19/51* (2013.01); *G01S 13/08* (2013.01); *G01S 15/08* (2013.01); *G01S 2205/00* (2013.01)

(58) Field of Classification Search
CPC ...... G01S 19/421; G01S 5/0072; G01S 19/07; G01S 19/40; G01S 19/51; G01S 13/08; G01S 15/08; G01S 2205/00; G01C 23/00
USPC ................... 701/300, 410; 340/988; 342/358
See application file for complete search history.

(56) References Cited

U.S. PATENT DOCUMENTS

| | | | |
|---|---|---|---|
| 3,618,099 A * | 11/1971 | Johnson | .................. G01S 11/02 342/119 |
| 5,786,790 A | 7/1998 | Abbott | |
| 6,415,229 B1 | 7/2002 | Diekhans | |
| 2002/0055819 A1* | 5/2002 | Shimizu | ................. G01C 21/28 701/410 |
| 2005/0122252 A1* | 6/2005 | Xu | ........................ G01S 5/0252 342/118 |
| 2015/0168560 A1* | 6/2015 | Ralphs | ................... G01C 21/20 701/23 |

FOREIGN PATENT DOCUMENTS

| | | |
|---|---|---|
| DE | 102013001120 A1 | 7/2014 |
| DE | 102013003588 A1 | 9/2014 |
| JP | 2011080928 A * | 4/2011 |

* cited by examiner

*Primary Examiner* — Marthe Y Marc-Coleman
(74) *Attorney, Agent, or Firm* — Lorenz & Kopf LLP

(57) ABSTRACT

A method for positioning a vehicle includes deriving an estimated position of the vehicle by way of a satellite signal received from the vehicle, receiving a correction signal from a second vehicle, and correcting the estimated position by way of the correction signal.

8 Claims, 2 Drawing Sheets

Fig. 1
Fig. 2
Fig. 3
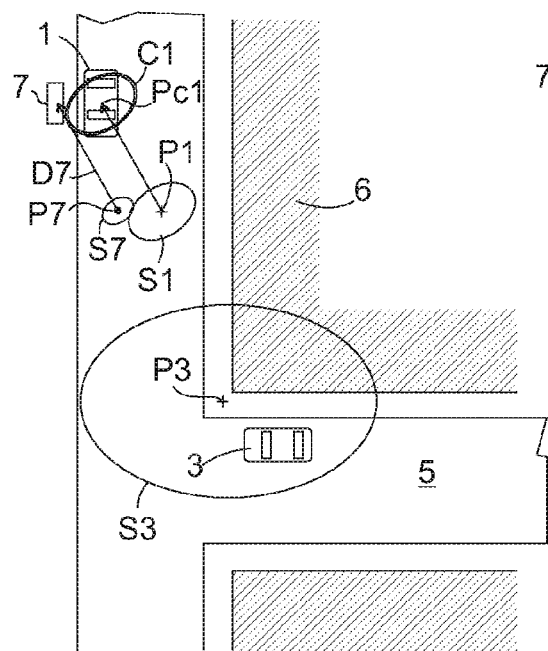
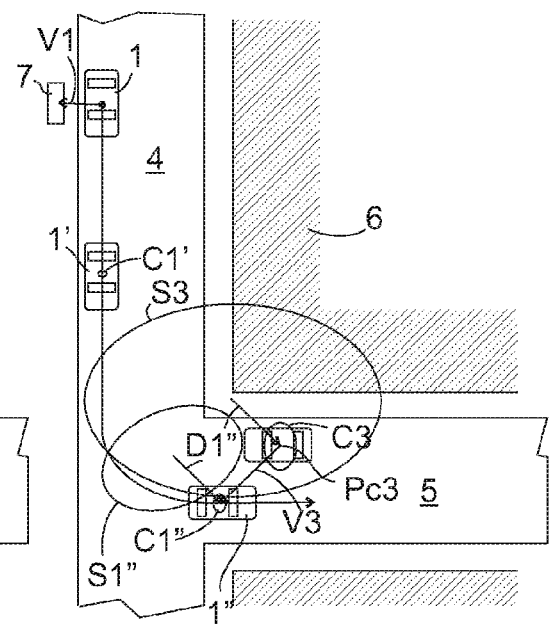
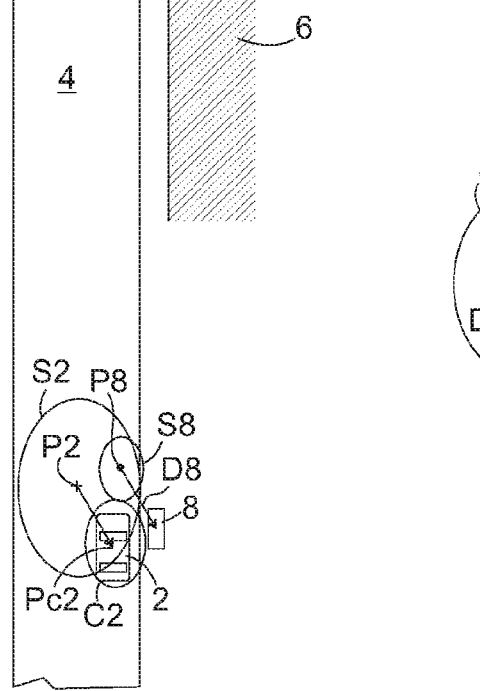
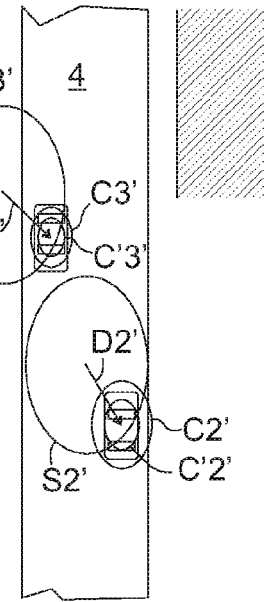

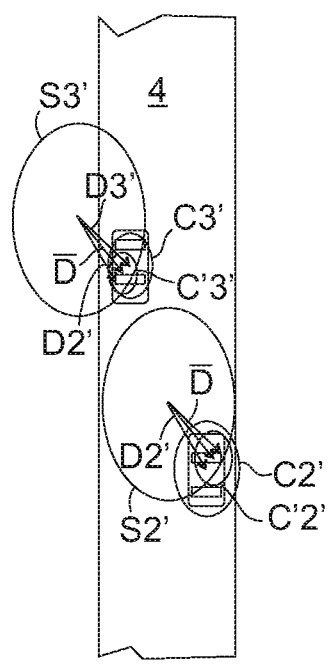

METHOD FOR POSITIONING A VEHICLE

CROSS-REFERENCE TO RELATED APPLICATION

This application claims priority to German Patent Application No. 102015009650.8, filed Jul. 25, 2015, which is incorporated herein by reference in its entirety.

TECHNICAL FIELD

The present disclosure pertains to a method for positioning a vehicle.

BACKGROUND

Methods, in which the geographical position of a vehicle is determined with the help of the signals of navigation satellites, in particular of the GPS satellites, are generally known and form the basis of modern vehicle navigation systems. The positioning accuracies that are conventionally achievable with these signals of the order of magnitude of a few meters are adequate in order to correctly identify in the very most cases a road, on which a vehicle using the navigation system is located, and in order to be able to issue navigation instructions to the driver of the vehicle on that basis. For further automation applications, however, in particular for fully automatic travelling, the accuracy of the popular methods is not yet adequate.

A reason for inaccuracies during the GPS positioning are fluctuating signal propagation delays between the transmitting satellite and the receiving vehicle due to atmospheric interferences. A further cause of measurement inaccuracies can be an unfavorable position of a satellite in which the propagation delay of its signal to the vehicle does not adequately vary with its geographical position or propagation delay distortions, which can occur in particular in heavily built-up cities, when the direct visual connection between satellite and vehicle is blocked by a building and the signal of the satellite cannot reach the vehicle by direct route, but only after a reflection.

In order to improve the positioning accuracy it has been proposed to install stationary receiver units along the roads which in turn receive the satellite signals, carry out an estimate of their own position by way of the satellite signals and calculate the deviation between this estimated and a true position, passing it on to the passing vehicles. When the causes of errors, to which the stationary station and the passing vehicle are exposed are identical, then the error between estimated and true position for vehicle and stationary station should also be the same and a true position of the vehicle can be determined by vectorially adding the deviation that is determined by the stationary station to the estimated position of the vehicle.

The problem with this approach however lies in that the causes of errors in turn are position-dependent and consequently the deviation between the position that was estimated by way of the satellite signals and the true position at the place of the stationary receiver unit need not be the same as at the place of the vehicle. The greater the distance between the two is, the less suitable is the deviation measured by the stationary unit for improving the accuracy of the positioning of the vehicle or the more numerous must the stationary stations arranged along a road in order to make possible a precise positioning of the vehicles everywhere.

SUMMARY

In accordance with the present disclosure a method is provided for a precise positioning of a vehicle which manages to get by without a close network of stationary stations. This vehicle, for distinction from other vehicles with which this vehicle communicates, is also referred to herein as the Ego vehicle. An estimated position of the Ego vehicle is determined by way of a satellite signal received from the Ego vehicle. A correction signal is received from a second vehicle. The estimated position is corrected by way of the correction signal. In this way, the Ego vehicle can offset any poor own reception conditions which only allow a faulty positioning in that it utilizes data of other vehicles which if appropriate have better reception conditions or for other reasons have more accurate positioning information.

If appropriate, correction signals of multiple vehicles can also be utilized in order to offset accidental errors of the position estimate by averaging many measurements that are independent of one another. A correction by way of the positioning information of multiple vehicles can automatically be obtained in that the second vehicle, from which the Ego vehicle obtains the correction signal, also has corrected its position by way of the correction signal of a third vehicle beforehand. The Ego vehicle can, however, obtain further correction signals in addition to the correction signal of the second vehicle and perform the correction by way of all correction signals received.

The information content of the correction signal can be different depending on configuration of the method. According to a first configuration, the correction signal can include extent and direction of a deviation between a position that was—possibly erroneously—estimated by way of a satellite signal received from the second vehicle and a position of the second vehicle considered true. Thus, the correction can take place in that the (possibly weighted) deviation is vectorially added to the estimated position initially derived.

When a dimension for the reliability of the deviation is additionally encoded in the correction signal, this can be extracted on the part of the Ego vehicle and taken into account during the correction of the estimated position. In particular, a weighting factor can be derived from the dimension for the reliability with which the transmitted deviation is multiplied before it is vectorially added to the estimated position.

The longer the reception of a correction signal lies in the past, the lower is its expressiveness. When, therefore, following the receiving of a correction signal the steps are repeated multiple times, the influence of the correction signal on the corrected estimated position should decrease from one repetition to the other. The speed of this decrease can be coupled to the speed of the vehicle. This means that the faster the vehicle moves the faster the expressiveness of the correction signal for the position of the vehicle also decreases.

The position of the second vehicle assumed to be true can be obtained in ways that are analogous to the method described above in that an estimated position of the second vehicle is derived by way of a satellite signal received from this second vehicle, a correction signal is received from a third vehicle and the estimated position of the second vehicle is corrected by way of the correction signal. Alternatively, the correction signal however can also be received from a stationary reference station. In this way, the second vehicle, when it passes closely enough to a reference station and in the process receives the correction signal from the reference station, determine its own position with high accuracy. By measuring the distance covered following the passing of the reference station the second vehicle can retain an accurate knowledge of its true position even for an extended period of time following the passing of the reference station and at a possibly greater distance from the same and supply a correction signal which has a maximum of reliability.

According to a second configuration of the method the correction signal can also include, instead or in addition to the deviation, the absolute geographical position of the second vehicle. In order to be able to utilize this position for correcting the estimated position of the Ego vehicle, the distance vector between Ego vehicle and second vehicle should be measured. Practically, this measurement should be performed by the Ego vehicle. It is, however, also conceivable that the distance vector is measured by the second vehicle and made available to the Ego vehicle in the correction signal.

Here, too, the correction signal should additionally include a dimension for the reliability of the position of the second vehicle.

The distance vector can be determined in particular optically, for example by analyzing an image taken by a camera of the first vehicle or by way of triangulation or by way of an echo reflected from the second vehicle, for example with the help of a radar or ultrasound distance measuring device.

A computer program product with program code, which enable a computer, in particular of the first vehicle, to carry out the method described above, or a computer-legible data carrier, on which the program instructions are recorded, which enable the computer to carry out the method is also subject of the present disclosure.

A further subject of the present disclosure is a device for installation in a first vehicle, having a processor or other means configured to derive an estimated position of the first vehicle by way of a satellite signal received from the vehicle, receive a correction signal from a second vehicle, and correct the estimated position by way of the correction signal.

BRIEF DESCRIPTION OF THE DRAWINGS

The present disclosure will hereinafter be described in conjunction with the following drawing figures, wherein like numerals denote like elements.

FIG. 1 shows a first traffic situation with multiple vehicles applying the method according to the present disclosure;

FIG. 2 shows a second traffic situation with multiple vehicles applying the method according to the present disclosure;

FIG. 3 shows a third traffic situation with multiple vehicles applying the method according to the present disclosure; and FIG. 4 shows a fourth traffic situation with multiple vehicles applying the method according to the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In FIG. 1, vehicles 1, 2 are located on a first road 4 and a vehicle 3 on a road 5 transversely enters the road 4. The roads 4, 5 are partly flanked by high buildings 6 which impair the reception of satellite navigation signals by the vehicles 1, 2. The vehicles 1, 2, 3 are each equipped with a satellite navigation system known per se, which is capable of estimating, based on received satellite navigation signals, the position P1, P2 and P3 respectively of the vehicle concerned. The reliability of this estimate is different depending on the strength of the received signals, number of receivable satellites and their position on the sky and is also shown in FIG. 1 by the ellipses S1, S2, S3 surrounding the estimated positions P1, P2, P3. Each of these ellipses Si (where i is 1, 2, 3 . . . ) surrounds those points for which the sojourn probability of the vehicle estimated by way of the satellite signal of the vehicle i at this point exceeds a limit value, wherein the limit value for each ellipse is determined so that the sojourn probability integrated over the entire ellipse Si reaches a value just under 1 that is the same for all ellipses. The dimensions of the ellipses S1, S2, S3 are thus inversely proportional to the quality of the position is estimate.

In the case of vehicle 1, the ellipse S1 does not overlap with the vehicle 1. The estimate position P1 is thus clearly detective which can be attributable to deflection of the satellite signal on a wall of the building 6.

Adjacent to the vehicle 1 a reference station 7 is located on the shoulder of the road which like the navigation system of the vehicle 1 receives and evaluates the satellite signals, obtaining as result a position P7 and as dimension for its reliability an ellipse S7. The ellipse S7 will generally be smaller than the ellipse S1 since the reference station 7 is unmoved and therefore through long measurement times or means via repeated measurements can achieve a more reliable estimate than the navigation system of the vehicle 1.

The reference station 7 knows its exact geographical position and can compare the same with the position P7 that was estimated by way of the satellite system. The offset between estimated and true position of the reference station 7 is a vector D7.

The reference station 7 emits a correction signal in which the vector D7, the quality of its estimate and the true geographical position P7 of the reference station 7 are encoded. On the part of the vehicle 1, the estimate of the own position is corrected to Pc1, in that it is shifted corresponding to the offset D7. The systematic error attributable to reflection on the building front is now rectified and as to be expected, the corrected ellipse C1 overlaps with the vehicle. Since accidental measurement errors of the vehicle navigation system and of the reference station 7 are superimposed on one another with the corrected position estimate, the accuracy of the corrected position estimate Pc1 cannot be better than the estimates of vehicle 1 and reference station 7 on which it is based; hence the ellipse C1 is drawn slightly larger than S1.

In the case of the vehicle 2, the quality of the satellite signal is poor for example because of an unfavorable position or low number of the received satellites so that the ellipse S2 about P2, within which the vehicle 2 is located with predetermined probability, is large. Here, too, a reference station 8 is located on the shoulder of the road which likewise carries out a position estimate and in the process obtains as result the position P8 with the ellipse S8 that is representative for the measurement accuracy or an offset D8 between the estimated position P8 and the true position.

When the vehicle 2 receives the correction signal of the reference station 8 and corrects its own estimated position P2 by the offset D8, the result Pc2 is still located within the ellipse S2. Other than in the case of the vehicle 1 there is thus no reason for assuming a systematic error of the position estimate. Although the corrected estimate cannot be more reliable than that of the reference station 8 however it is definitely more reliable than the original estimate, which is why the ellipse C2 about Pc2, of which it is now assumed that the position of the vehicle with high probability is within it, is at least as large as S8, but smaller than S2.

On the road 5 flanks on both sides by buildings 6, the vehicle 3 has particularly poor reception conditions with weak signals which is why the position estimate in this case is afflicted by particular uncertainty and the ellipse S3 about the estimated position P3 accordingly is particularly large.

The vehicle 1 is equipped with a camera or a radar device which allows it to detect objects of its surroundings such as for example the reference station 7 and to vectorially measure the distance to them. The result of such a measurement is the vector V1 drawn into FIG. 2 and connection vehicle 1 and the reference station 7. Based on this vector V1 and the true position of the reference station 7 which is encoded in the correction signal of the reference station 7, the navigation system of the vehicle 1 is able to determine its position with a high degree of accuracy and reliability so that the result can be assumed as true position of the vehicle 1. When the vehicle 1 moves on the road 4 it uses odometric information of distance counters and steering in order to continuously update its true position. Inevitable odometric measurement inaccuracies result in that the reliability of the position information decreases to the extent in which the vehicle 1 distances itself from the reference station 7, as illustrated in FIG. 2 by ellipses C1', C1" that gradually become larger along the route of the vehicle 1 via positions 1', 1".

From time to time, in the case under consideration here at position 1" shortly after turning into the road 5, the vehicle 1 again carries out a position estimate by way of the satellite signal. The result of the estimate is the ellipse S1", its center point compared to the true position of the vehicle in the center of the ellipse C1" is offset by the vector D1". It can therefore be assumed that the measurements at the position 1" have a systematic deviation D1". The vehicle 1 therefore emits a correction signal in the same manner as the reference stations 7, 8 which contains the position of the vehicle 1 to be assumed true in the center of C1", the offset vector D1" and the dimensions of the ellipse S1".

Based on the reception of this correction signal, the vehicle 3 corrects its own position estimate, in this case by D1", and can assign it a degree of reliability that is substantially improved compared with S3, as symbolized in FIG. 2 by the ellipse C3, the dimensions of which are between those of the ellipses S3 and C1". In other words, the vehicle 3 profits from the highly-accurate position that the vehicle 1 has been able to carry out on the reference station 7 without it having to enter into communication with the reference station 7 itself or having to get near it.

Alternatively, the vehicle 3 could also correct its own position estimate by a vector cD1", wherein c is a scaler quantity between 0 and 1. The precise numerical value of c depends on the reliability of the positions of the vehicles 2 and 3, i.e. the smaller the ellipses S1", C1" are, the more reliable the offset vector D1" consequently is, and the greater S3 is, the nearer to 1 is c.

When the vehicle 3, as described above for the vehicle 1, is equipped with a camera or radar device, which is capable of identifying the passing vehicle 1, a distance vector V3 between the vehicles 1 and 3 can also be determined with the help of this camera or radar device, and the vehicle 3 is able to utilize the true position of the vehicle 1 contained in the correction signal in that it calculates its own position by adding the vector V3 to the position of the vehicle 1.

When the vehicle 3 later on turns into the road 4, it will soon come towards the vehicle 2, as shown in FIG. 3. Since the exchange of information with the vehicle 1 or with the reference station 8, both vehicles have updated their own true position, in each case in the center of the ellipses C2', C3', by way of odometric data and are thus able to determine a current offset D3' or D2' between the updated true position and the position estimated by way of satellite signals in each case in the center of the ellipses S2', S3' and to transmit the same within the scope of a correction signal to the respective other vehicle. Since the offset vectors D2', D3' have materialized in different ways, the probability that they are correct is high in the case of agreement. In the case of FIG. 3 there is a useful agreement both in the amount and also in the direction of the vectors D2', D3', so that both vehicles can assign their true positions a higher degree of reliability, illustrated in FIG. 3 by a reduction in size of the ellipses C2', C3' to C'2' respectively C'3'.

In the version shown in FIG. 4, the two vehicles each form a weighted mean value $\overline{D}$ of the two offset vectors D2', D3'. The weight, with which each offset vector D2', D3' is included in the averaging is proportion to its reliability, for example inversely proportional to the area of the ellipses S2' and C2' or S3' and C3'. The positions which are obtained by vectorially adding the offset vector $\overline{D}$ to the positions in the center of the ellipses S2', S3' estimated by way of the satellite signals are now assumed as true positions of the vehicles 2, 3.

By many vehicles in dense traffic interchange correction signals among one another in the described manner, a high degree of consensus regarding the offset between the position estimated by way of the satellite signal and the true position is achievable on a given road section, which advantageously enables the vehicles especially with high traffic density to automatically navigate with high accuracy relative to one another.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for positioning a first vehicle comprising:
   a) deriving, by a processor of the first vehicle, an estimated position of the first vehicle by way of a satellite signal received by the first vehicle;
   b) receiving, by the processor of the first vehicle, a correction signal from a second vehicle that includes a position of the second vehicle;
   c) correcting, by the processor of the first vehicle, the estimated position by way of the correction signal received from the second vehicle to determine a corrected estimated position;
   d) measuring, by the processor of the first vehicle, a distance vector between the first vehicle and the second vehicle based on an optical image taken by a camera of the first vehicle that identifies the second vehicle;
   correcting, by the processor of the first vehicle, the corrected estimated position of the first vehicle based on the distance vector to determine an assumed true position of the first vehicle; and outputting, by the processor of the first vehicle, a correction signal from the first vehicle that includes the assumed true position of the first vehicle to a third vehicle.

2. The method according to claim 1, wherein the correction signal received from the second vehicle comprises extent and direction of a deviation between a position of the second vehicle and a position estimated by way of a satellite signal received by the second vehicle.

3. The method according to claim 2, further comprising deriving, by the processor of the first vehicle, a dimension for the reliability of the deviation from the correction signal received from the second vehicle and correcting, by the processor of the first vehicle, the estimated position by way of the correction signal received from the second vehicle and the dimension.

4. The method according to claim 3, wherein a) and c) are repeated multiple repetitions following b) such that an influence of the correction signal received from the second vehicle on the corrected estimated position decreases from one repetition to the next repetition.

5. The method according to claim 2, wherein the position of the second vehicle assumed to be true is obtained by:
deriving an estimated position of the second vehicle by way of a satellite signal received by the second vehicle;
receiving a second correction signal from one of a third vehicle or a stationary reference station; and
correcting the estimated position of the second vehicle by way of the second correction signal.

6. The method according to claim 1, wherein the correction signal received from the second vehicle comprises a dimension for the reliability of the position of the second vehicle.

7. A non-transitory computer readable medium comprising program code which enable a computer to carry out the method according to claim 1.

8. A device for installation in a first vehicle comprising a processor configured to:
derive an estimated position of the first vehicle by way of a satellite signal received by the first vehicle;
receive a correction signal from a second vehicle that includes an assumed position of the second vehicle, and an extent and direction of a deviation between the assumed position of the second vehicle and an estimated position of the second vehicle derived by way of a satellite signal received by the second vehicle;
correct the estimated position by way of the correction signal received from the second vehicle to determine a corrected estimated position;
measure a distance vector between the first vehicle and the second vehicle based on an optical image taken by a camera of the first vehicle that identifies the second vehicle;
correct the corrected estimated position of the first vehicle based on the distance vector to determine an assumed true position of the first vehicle; and
output a correction signal from the first vehicle that includes the assumed true position of the first vehicle and an extent and direction of a deviation between the assumed true position of the first vehicle and the estimated position of the first vehicle to a third vehicle.

* * * * *